(12) United States Patent
Shimizu et al.

(10) Patent No.: US 9,088,031 B2
(45) Date of Patent: Jul. 21, 2015

(54) BATTERY MODULE

(75) Inventors: Keisuke Shimizu, Osaka (JP);
Tomohiko Yokoyama, Osaka (JP);
Masato Fujikawa, Osaka (JP);
Shunsuke Yasui, Osaka (JP); Daisuke Kishii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 578 days.

(21) Appl. No.: 13/390,287

(22) PCT Filed: Jul. 20, 2011

(86) PCT No.: PCT/JP2011/004101
§ 371 (c)(1),
(2), (4) Date: Feb. 13, 2012

(87) PCT Pub. No.: WO2012/060031
PCT Pub. Date: May 10, 2012

(65) Prior Publication Data
US 2012/0231317 A1   Sep. 13, 2012

(30) Foreign Application Priority Data
Nov. 5, 2010   (JP) .................................. 2010-248388

(51) Int. Cl.
*H01M 2/10* (2006.01)
*H01M 10/0525* (2010.01)
(Continued)

(52) U.S. Cl.
CPC ............ *H01M 2/105* (2013.01); *H01M 10/503* (2013.01); *H01M 10/5004* (2013.01);
(Continued)

(58) Field of Classification Search
CPC ................... H01M 10/5075; H01M 10/5077; H01M 10/0525; H01M 10/50; H01M 6/42; H01M 6/5038; H01M 2/105; H01M 10/5055; H01M 10/5004; H01M 10/5016; Y02T 10/7011
USPC .......................................... 429/120, 149, 247
See application file for complete search history.

(56) References Cited

U.S. PATENT DOCUMENTS

| 4,578,324 A * | 3/1986 | Koehler et al. ............... 429/439 |
| 6,255,015 B1 | 7/2001 | Corrigan et al. |

(Continued)

FOREIGN PATENT DOCUMENTS

| JP | 2001-313078 A | 11/2001 |
| JP | 2009-508308 A | 2/2009 |
| JP | 2009-301969 A | 12/2009 |
| JP | 2009-301969 A | 12/2009 |

OTHER PUBLICATIONS

Huntsman (Product brochure Ethylene Glycol p 13 and copyright date 1998 Huntsman Technical Services The Woodlands TX, taken as December).*
International Search Report issued in International Patent Application No. PCT/JP2011/004101, dated Oct. 18, 2011.

*Primary Examiner* — Patrick Ryan
*Assistant Examiner* — Aaron Greso
(74) *Attorney, Agent, or Firm* — McDermott Will & Emery LLP

(57) ABSTRACT

A battery module 100 includes a plurality of cells 10, wherein a cooling unit 20 in which a coolant is sealed is disposed in the vicinity of the cells 10, the coolant is liquid adjusted to have a viscosity within the range of 2 Pa·s to 350 Pa·s, and the cooling unit 20 includes an unsealable portion 23 which is partially unsealed to release the coolant when at least one of the cells 10 abnormally generates heat.

13 Claims, 6 Drawing Sheets

(51) Int. Cl.
*H01M 10/613* (2014.01)
*H01M 10/625* (2014.01)
*H01M 10/643* (2014.01)
*H01M 10/6555* (2014.01)
*H01M 10/6567* (2014.01)

(52) U.S. Cl.
CPC ...... *H01M10/5016* (2013.01); *H01M 10/5055* (2013.01); *H01M 10/5075* (2013.01); *H01M 10/0525* (2013.01); *Y02T 10/7011* (2013.01)

(56) References Cited

U.S. PATENT DOCUMENTS

| | | |
|---|---|---|
| 7,433,794 B1 | 10/2008 | Berdichevsky et al. |
| 2007/0184337 A1* | 8/2007 | Nagayama et al. ............. 429/53 |
| 2008/0292950 A1* | 11/2008 | Maeda et al. ................. 429/120 |
| 2009/0023025 A1 | 1/2009 | Korsgaard |

* cited by examiner

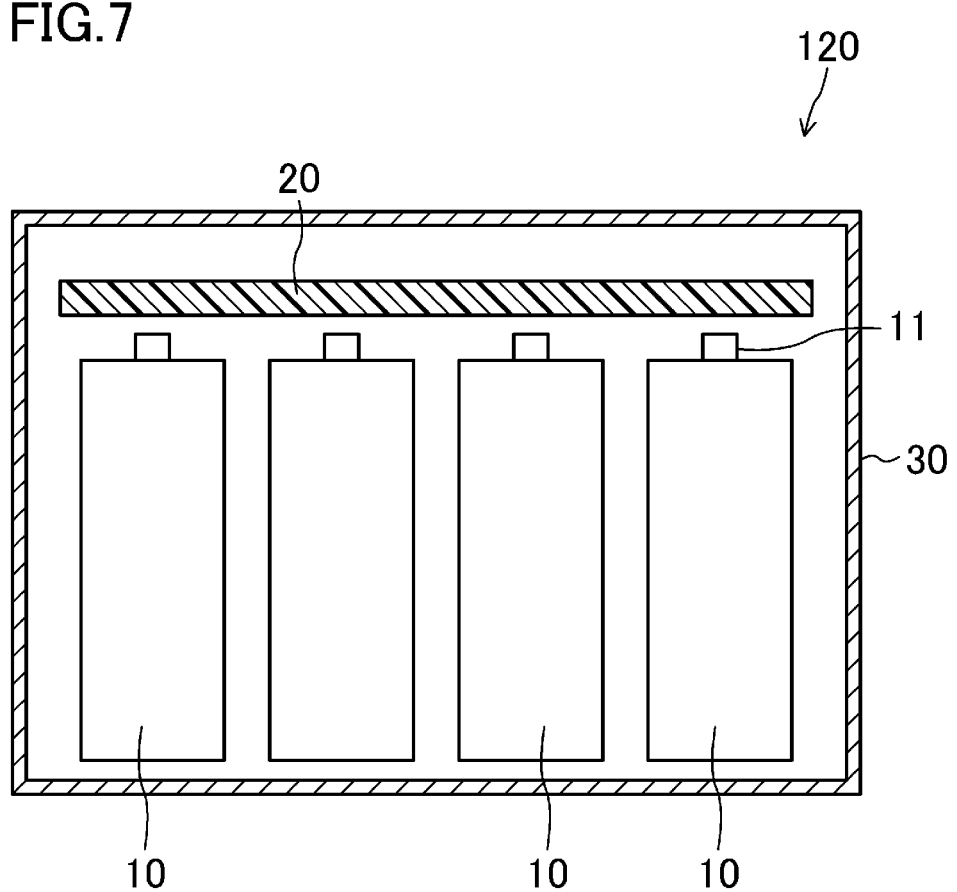

BATTERY MODULE

RELATED APPLICATIONS

This application is the U.S. National Phase under 35 U.S.C. §371 of International Application No. PCT/JP2011/004101, filed on Jul. 20, 2011, which in turn claims the benefit of Japanese Application No. 2010-248388, filed on Nov. 5, 2010, the disclosures of which Applications are incorporated by reference herein.

TECHNICAL FIELD

The present invention relates to battery modules, and particularly to battery modules including a coolant.

BACKGROUND ART

Reusable secondary batteries have been used as power sources of portable electronic devices, mobile telecommunication devices, etc., to save resources and energy. Use of such secondary batteries as power sources of vehicles etc. has been considered to reduce an amount of fossil fuel used, an amount of $CO_2$ emission, etc.

In particular, a technology of connecting general-purpose batteries in parallel or series to constitute battery modules, and combining the battery modules for a wide variety of uses has practically been employed. According to the technology, the battery modules can be downsized and reduced in weight by improving performance of the batteries (hereinafter referred to as "cells") constituting the battery modules. This can advantageously improve workability in combining the battery modules, a degree of freedom in mounting the battery modules in limited space in the vehicle, etc.

When the cells are arranged to be close to each other, the battery module can be increased in energy density, and can be downsized. However, when the distance between the adjacent cells is too short, if one of the cells experienced an internal short circuit etc., and abnormally generated heat (hereinafter referred to as "in the event of abnormal heat generation"), normal cells around the abnormally heated cell (abnormal cell) are exposed to high temperature, and chained abnormal heat generation may possibly occur.

Patent Document 1 discloses a cooling tube disposed in the vicinity of cells so that a coolant is released when the cooling tube is partially molten in the event of the abnormal heat generation in order to allow heat dissipation of the cells.

CITATION LIST

Patent Document

PATENT DOCUMENT 1: U.S. Pat. No. 7,433,794

SUMMARY OF THE INVENTION

Technical Problem

When a cell abnormally generates heat, the temperature of the cell rapidly rises. Therefore, in order to prevent the heat from diffusing through peripheral cells, the temperature of the abnormally heated cell has to be rapidly reduced. In the cooling method described in Patent Document 1, a coolant (liquid) is released to an abnormally heated cell to cool the cell by heat of vaporization of the coolant. The cooling method of Patent Document 1 is advantageous in terms of high cooling efficiency.

For example, when water is used as a coolant, a rapid reduction in temperature of an abnormally heated cell is expected by directly bringing the water into contact with the cell to cool the cell by utilizing heat of vaporization of the water because the specific heat capacity of water is 4.2 J/g·K, whereas heat of vaporization of water is as high as about 2250 J/g.

However, the viscosity of water is low (about 1 mPa·s at 20° C.). Thus, even when water released from the cooling tube is brought into contact with the abnormally heated cell, the water falls off the cell before a sufficient amount of the water is vaporized. For this reason, no sufficient cooling effect is produced. In contrast, when a plurality of cells is sunk into water, a sufficient cooing effect is produced, but a lot of excessive water which is not vaporized is contained in the battery module, which may reduce the energy density per mass of the battery module.

The present invention was devised in view of the foregoing. It is a major objective of the present invention to provide a battery module having high cooling efficiency, wherein when a cell included in the battery module abnormally generates heat, the temperature of the abnormally heated cell can be rapidly reduced.

Solution to the Problem

To achieve the objective, the viscosity of a coolant released to an abnormally heated cell in a battery module of the present invention is adjusted in such a range that the coolant is in contact with the cell for a long period of time, and a large amount of the coolant is vaporized.

That is, a battery module according to the present invention includes a plurality of cells, wherein a cooling unit in which a coolant is sealed is disposed in the vicinity of the cells, and the coolant is liquid adjusted to have a viscosity within the range of 2 Pa·s to 350 Pa·s. The cooling unit includes an unsealable portion which is partially unsealed to release the coolant when at least one of the cells abnormally generates heat. Preferably, the liquid adjusted to have a viscosity within a predetermined range is made of water to which a thickener is added.

Advantages of the Invention

According to the present invention, when a cell included in a battery module abnormally generates heat, a cooling unit in which a coolant is sealed is partially unsealed to release the coolant adjusted to have a viscosity within a predetermined range to the abnormally heated cell, so that the temperature of the abnormally heated cell can be rapidly reduced by heat of vaporization of a sufficient amount of the coolant. Thus, a highly safe battery module having a high energy density per mass can be obtained.

BRIEF DESCRIPTION OF THE DRAWINGS

FIG. 7 is a plan view schematically illustrating a configuration of a battery module of still another embodiment of the present invention.

DESCRIPTION OF EMBODIMENTS

Embodiments of the present invention will be described in detail below with reference to the drawings. The present invention is not limited to the following embodiments. The embodiment can be modified without deviating from the effective scope of the present invention. The embodiment can be combined with other embodiments.

Figure 1:
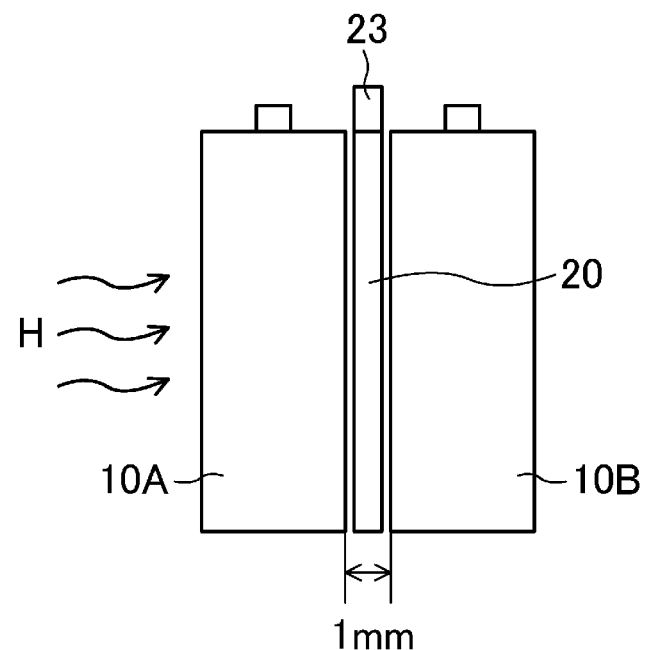
FIG. 1 is a view illustrating a test method for verifying differences in cooling effect which are made by varying the viscosity of a coolant.

FIG. 1 is a view illustrating a test method to verify differences in cooling effect which are made by varying the viscosity of a coolant.

As illustrated in 1, cylindrical lithium-ion batteries 10A, 10B of size 18650 (18 mm in diameter×65 mm in length) (2.6 Ah in capacitance) are aligned 1 mm away from each other, and a cooling unit 20 in which a coolant is sealed is arranged between the batteries 10A, 10B.

Figure 2:
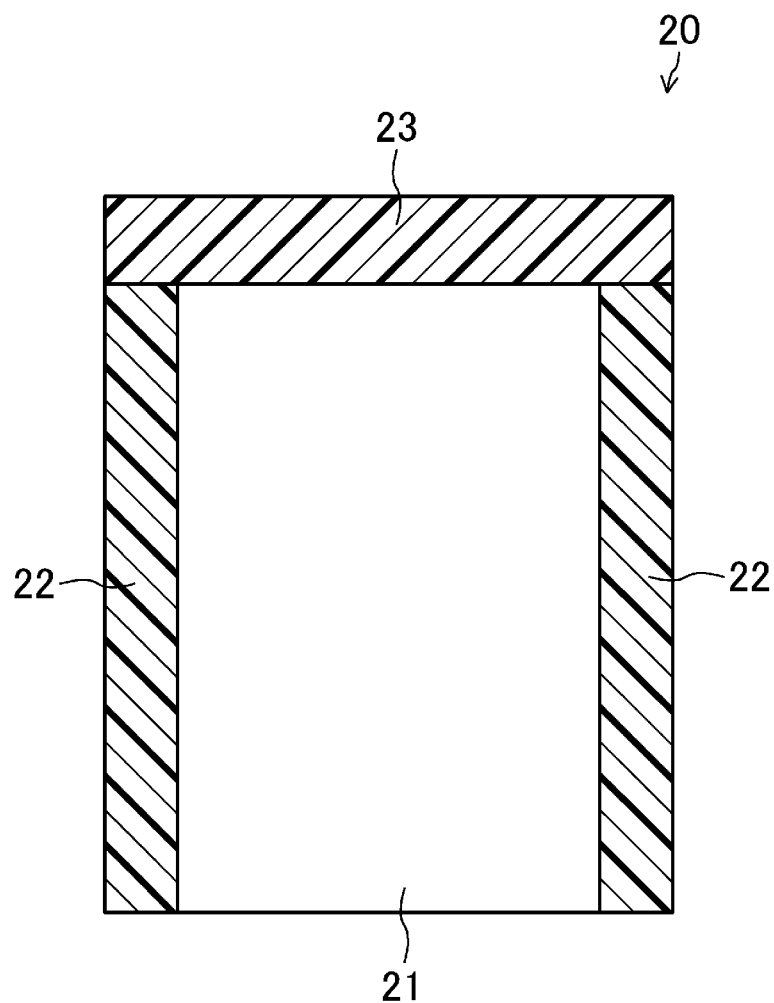
FIG. 2 is a side view schematically illustrating a configuration of a cooling unit of the present invention.

FIG. 2 is a side view schematically illustrating a configuration of the cooling unit 20. As illustrated in FIG. 2, the cooling unit 20 is formed by folding a laminate film 21, and rims of overlapping parts on three sides of the folded film are sealed by fusing. As the coolant, 2 g of water is sealed in the laminate film 21. Of sealed portions 22, 22, 23 fused at the rims of the laminate film 21, the sealed portion 23 located on a side opposite to the folded portion serves as an unsealable portion having a lower welding strength than the other sealed portions 22, 22. Thus, in the event of abnormal heat generation, the unsealable portion 23 of the cooling unit 20 is first unsealed to release the coolant through the unsealable portion 23.

As illustrated in FIG. 1, when a side surface of the cell 10A is heated by a heater H to cause thermal runaway of the cell 10A, the cell 10A abnormally generates heat, and the temperature of the cell 10A rises. This increases the temperature of the cooling unit 20 disposed in the vicinity of the cell 10A, so that the unsealable portion 23 of the cooling unit 20 is unsealed to release the coolant to the abnormally heated cell 10A.

Here, coolants having viscosities within the range of 0.3 Pa·s to 400 Pa·s were prepared by adding carboxymethylcellulose as a thickener to 2 g of water with the thickener being varied within the range of 0.3 mass % to 5.0 mass %. These coolants were each sealed in the cooling unit 20, and the cooling effect by the coolants released through the unsealable portion 23 was examined. Specifically, after the thermal runaway of the cell 10A was caused to unseal the unsealable portion 23 of the cooling unit 20 to release the coolant to the cell 10A, the highest temperature which the cell 10B reached was measured. Here, the viscosity of the coolant was measured by a BH viscometer (manufactured by Toki Sangyo Co., Ltd.) under conditions that a rotor had a diameter of 15 mm, the number of revolutions of the rotor was 2/min, and the temperature for measurement was 25° C. Moreover, the temperature of the cell 10B was measured by a K thermocouple. The highest temperature which the cell 10A reached after the thermal runaway was about 500° C.

The result is shown in Table 1. As illustrated in Table 1, when the coolant had a viscosity of 0.3 Pa·s, the highest temperature of the adjacent cell 10B was 168° C., whereas when the coolant had a viscosity of 2 Pa·s or higher, the highest temperature of the adjacent cell 10B was reduced to about 100° C. When the viscosity of the coolant was further increased, the highest temperature of the adjacent cell 10B gradually rose when the viscosity exceeded 350 Pa·s, and when the viscosity of the coolant reached 400 Pa·s, the highest temperature of the adjacent cell 10B reached 170° C. again. Although not shown in Table 1, when pure water to which no thickener was added (viscosity: 1 mPa·s (20° C.)) was used as the coolant, the highest temperature of the adjacent cell 10B reached 175° C.

TABLE 1

| Coolant | Amount of Added Thickener (mass %) | Viscosity (Pa · s) | Highest Temperature of Adjacent Cell (° C.) |
| --- | --- | --- | --- |
| Water 2 g | 0.3 | 0.3 | 168 |
|  | 1.2 | 2 | 115 |
|  | 2.3 | 50 | 100 |
|  | 3.0 | 350 | 121 |
|  | 5.0 | 400 | 170 |

For example, in the case of lithium-ion batteries, when an internal short-circuit is formed, and the temperature of a cell 10 is raised by Joule heat and exceeds about 150° C., reaction between an electrode and an electrolyte occurs, which may lead to abnormal heat generation. Thus, in order to prevent spread of chained abnormal heat generation from the abnormally heated cell to peripheral cells, it is effective to keep the temperature of the peripheral cells at about 150° C. or lower.

It can be seen from the result shown in Table 1 that when the viscosity of the coolant is adjusted to be within the range of 2 Pa·s to 350 Pa·s, the temperature of the adjacent cell 10B can be reduced to 150° C. or lower. That is, when the viscosity of the coolant is adjusted to be within the range of 2 Pa·s to 350 Pa·s, the spread of chained abnormal heat generation from the abnormally heated cell 10 to the peripheral cells 10 can be prevented.

This is probably because adjusting the viscosity of the coolant to be within the range of 2 Pa·s to 350 Pa·s extends the time period in which the coolant released from the cooling unit 20 is in contact with the abnormally heated cell 10A, so that a large amount of the coolant is vaporized, thereby cooling the cell 10A by heat of vaporization of a sufficient amount of the coolant. In contrast, when the viscosity of the coolant exceeded 350 Pa·s, the temperature of the adjacent cell 10B rose to 150° C. or higher again. This is probably because after the coolant is vaporized, a new coolant is not continuously supplied to the cell 10A, and the cooling efficiency is contrarily reduced.

Note that the cooling effect obtained by the above-described coolant is obtained by adjusting the viscosity of the coolant, and a material used for the coolant is not particularly limited. In particular, water has high heat of vaporization (about 2250 J/g), is chemically stable, and is suitable as a material which increases the cooling efficiency. Moreover, other than water, for example, silicone oil, ionic liquid, etc. may be used as the coolant.

Moreover, to adjust the viscosity of the coolant, for example, a predetermined amount of a thickener such as xanthan gum, gelatin, or alginic acid other than the carboxymethylcellulose used in the above-described test may be added to the coolant.

Moreover, the configuration of the cooling unit 20 is not particularly limited, but the laminate film in which the coolant is sealed as illustrated in FIG. 2 can be preferably used.

As the laminate film, for example, a three-layer film including a fusion layer, a base material, and an insulating layer is preferably used. Here, as the fusion layer, the base material, and the insulating layer, polypropylene (PP), polyethylene (PE), etc. having a thickness of about 40 μm, aluminum, stainless steel, etc. having a thickness of about 50 μm, and nylon, polyethylene terephthalate (PET), etc. may be used, respectively.

The sealed portions 22, 22, 23 fused at the rims of the laminate film 21 of the cooling unit 20 of FIG. 2 are configured in such a manner that a fusion layer of the sealed portion (unsealable portion) 23 is made of polyethylene, and a fusion layer of the other sealed portions 22, 22 is made of polypropylene. In this case, since the melting point of the polyethylene (120-130° C.) is lower than the melting point of the polypropylene (160-180° C.), the unsealable portion 23 of the cooling unit 20 is first molten when the temperature of the cooling unit rises in the event of abnormal heat generation, so that the coolant is released through the unsealable portion 23.

The cooling unit 20 configured as described above is automatically unsealed when the unsealable portion reaches a predetermined temperature in the event of abnormal heat generation of the cell 10. Thus, the cooling unit 20 does not require an additional temperature sensor and an additional unsealing mechanism, so that the cooling unit 20 can be simple and small-sized.

Note that the unsealable portion 23 may have a lower welding strength than the other sealed portions 22, 22, and such a configuration may be formed, other than by setting the melting point of the unsealable portion to be different from that of the other sealed portions 22, for example, by setting the welding pressure on the unsealable portion 23 to be lower than the welding pressure on the other sealed portions 22, 22, by setting the welding width at the unsealable portion 23 to be narrower than the welding width at the other sealed portions 22, 22, or by setting the welding temperature at the unsealable portion 23 to be lower than the welding temperature at the other sealed portions 22, 22, etc.

Moreover, the position of the unsealable portion 23 is not particularly limited, but if the unsealable portion 23 is located above the center of gravity of the cell 10 when a battery module 100 is in use, the coolant released through the unsealable portion 23 falls on an upper portion of the abnormally heated cell 10, so that it is possible to further increase the cooling efficiency.

Figure 3:
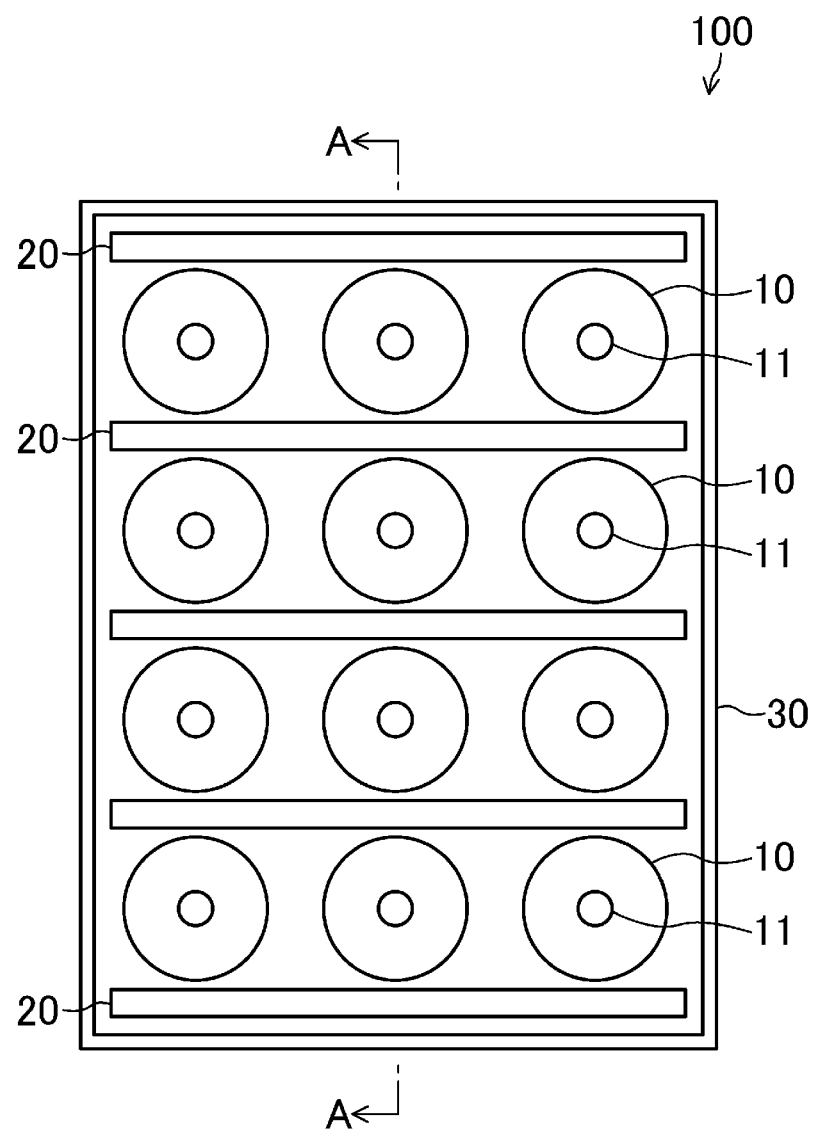
FIG. 3 is a plan view schematically illustrating a configuration of a battery module of an embodiment of the present invention.
Figure 4:
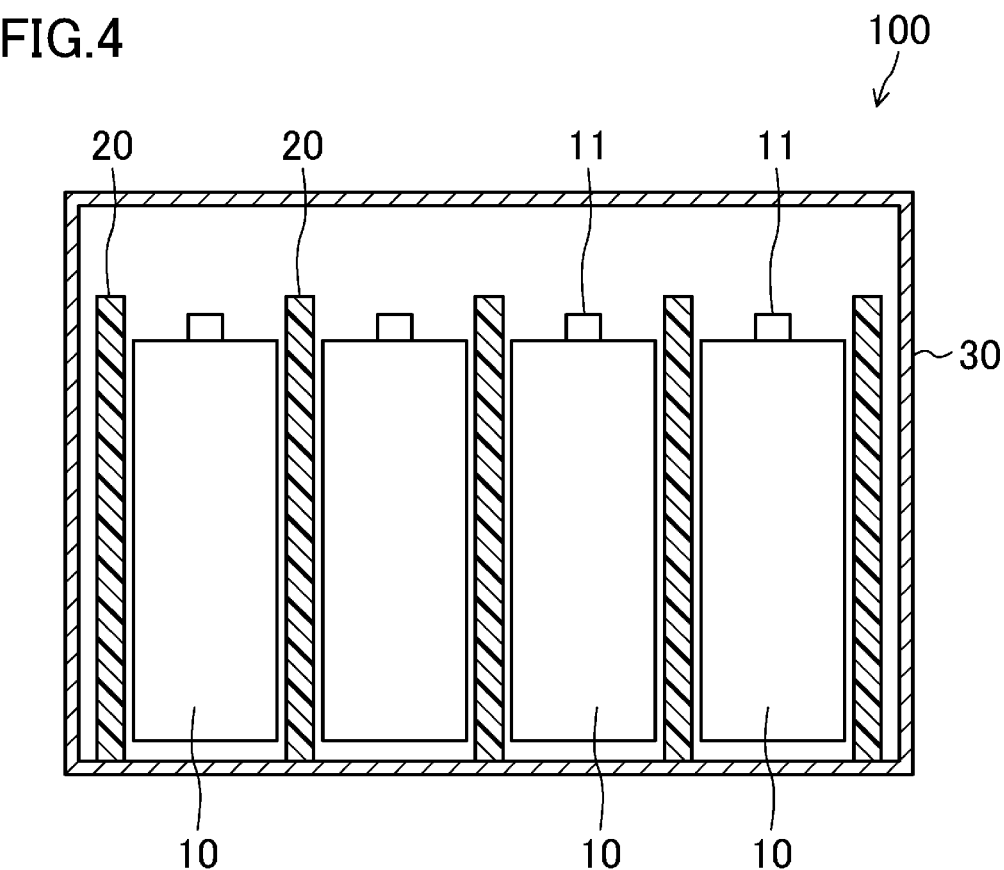
FIG. 4 is a cross-sectional view taken along the line A-A of FIG. 3.

FIGS. 3, 4 are views schematically illustrating a configuration of the battery module 100 of an embodiment of the present invention, where FIG. 3 is a plan view, and FIG. 4 is a cross-sectional view taken along the line A-A of FIG. 3.

As illustrated in FIGS. 3, 4, the battery module 100 of the present embodiment includes a plurality of cells 10 aligned and accommodated in a case 30, wherein cooling units 20 in which a coolant is sealed are disposed in the vicinity of the cells 10. Each cooling unit 20 includes an unsealable portion (not shown) which is partially unsealed to release the coolant when the temperature of the cell 10 increases and reaches or exceeds a predetermined temperature. Here, the coolant contained in the cooling unit 20 is liquid adjusted by adding a thickener to have a viscosity within the range of 2 Pa·s to 350 Pa·s.

The cells 10 may be, for example, cylindrical lithium ion secondary batteries. Each lithium ion secondary battery includes an electrode group formed by winding a positive electrode plate and a negative electrode plate with a separator interposed therebetween, the electrode group being accommodated in a battery case together with an electrolyte. An opening of the battery case is sealed with a sealing plate, a raised section 11 of the sealing plate serves as a positive electrode terminal, and a bottom section of the battery case serves as a negative electrode terminal. Moreover, the plurality of cells 10 is connected to each other in series or in parallel in the case 30.

Moreover, the cooling units 20 may be configured as illustrated in, for example, FIG. 2. In the present embodiment, the cooling units 20 are disposed between the cells 10 adjacent to each other, and are each formed as one piece provided for the plurality of cells 10.

In the present embodiment, when a cell 10 included in the battery module 100 abnormally generates heat due to an internal short-circuit, etc., the heat abnormally generated in the cell 10 raises the temperature of a cooling unit in the vicinity of the abnormally heated cell 10. When the cell 10 abnormally generates heat, the unsealable portion of the cooling unit 20 is unsealed, and the coolant having a viscosity adjusted to be within a predetermined range is released to the abnormally heated cell 10. For example, when the unsealable portion is welded at a fusion layer having a lower melting point than the other sealed portions, the unsealable portion is unsealed when the temperature of the unsealable portion reaches or exceeds the melting point. Alternatively, when the unsealable portion has a lower welding strength than the other sealed portions, the unsealable portion is unsealed when the coolant is heated and vaporized, and the pressure in the cooling unit 20 reaches or exceeds a predetermined value.

As described above, when the cell 10 abnormally generates heat, the unsealable portion of the cooling unit 20 in the vicinity of the abnormally heated cell 10 is unsealed to release the coolant to the abnormally heated cell 10. Here, since the coolant is adjusted to have a viscosity within a predetermined range, the coolant can be in contact with the abnormally heated cell 10 for a long time. Thus, heat of vaporization of a sufficient amount of the coolant can cool the abnormally heated cell 10, so that the temperature of the abnormally heated cell 10 can be rapidly reduced. In this way, spread of chained abnormal heat generation from the abnormally heated cell 10 to peripheral cells 10 can be prevented. Moreover, adjusting the viscosity of the coolant to be within a predetermined range increases the cooling efficiency of the coolant. Thus, the temperature of the abnormally heated cell 10 can be reduced by a small amount of the coolant. As a result, it is possible to obtain a highly safe battery module 100 having a high energy density per mass.

Here, the cooling units 20 are disposed in the vicinity of the cells 10. The distance from the cells 10 may be determined in such a manner that heat from the abnormally heated cell 10 is transferred to the cooling unit 20, and the temperature of the cooling unit 20 rises to unseal the unsealable portion of the cooling unit 20.

Figure 5:
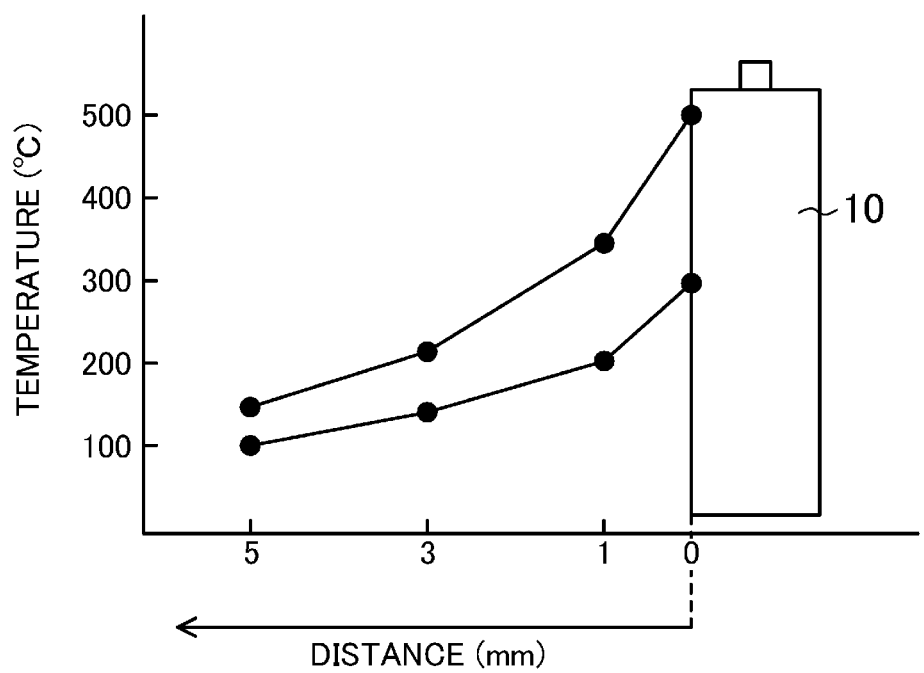
FIG. 5 is a graph illustrating temperatures at points away from an abnormally heated cell.

FIG. 5 is a graph illustrating values of temperatures at points respectively 1 mm, 3 mm, 5 mm away from the side surface of the abnormally heated cell 10, the values being calculated based on the thermal conductivity of an air layer (0.0234 W·m$^{-1}$·K$^{-1}$ at 20° C.). Here, the temperatures at the points were obtained in the case where the temperature at the side surface of the cell 10 was 300° C., and in the case where the temperature at the side surface of the cell 10 was 500° C.

As illustrated in FIG. 5, even at the point 1 mm away from the side surface of the cell 10, the temperatures reached 210° C. and 345° C. respectively for the temperatures of 300° C. and 500° C. at the side surface of the cell 10. Thus, even when the cooling unit 20 is disposed at a point about 1 mm away from the cell 10, the heat from the abnormally heated cell 10 is transferred to the cooling unit 20, and the temperature of the cooling unit 20 is increased, so that the unsealable portion of the cooling unit 20 can be unsealed.

As described above, the cooling unit 20 may be disposed in the vicinity of the cells 10, or of course, may be disposed in contact with outer surfaces of the cells 10. In this case, at least the unsealable portion 23 of the cooling unit 20 is preferably disposed in contact with the outer surfaces of the cells 10.

Figure 6:
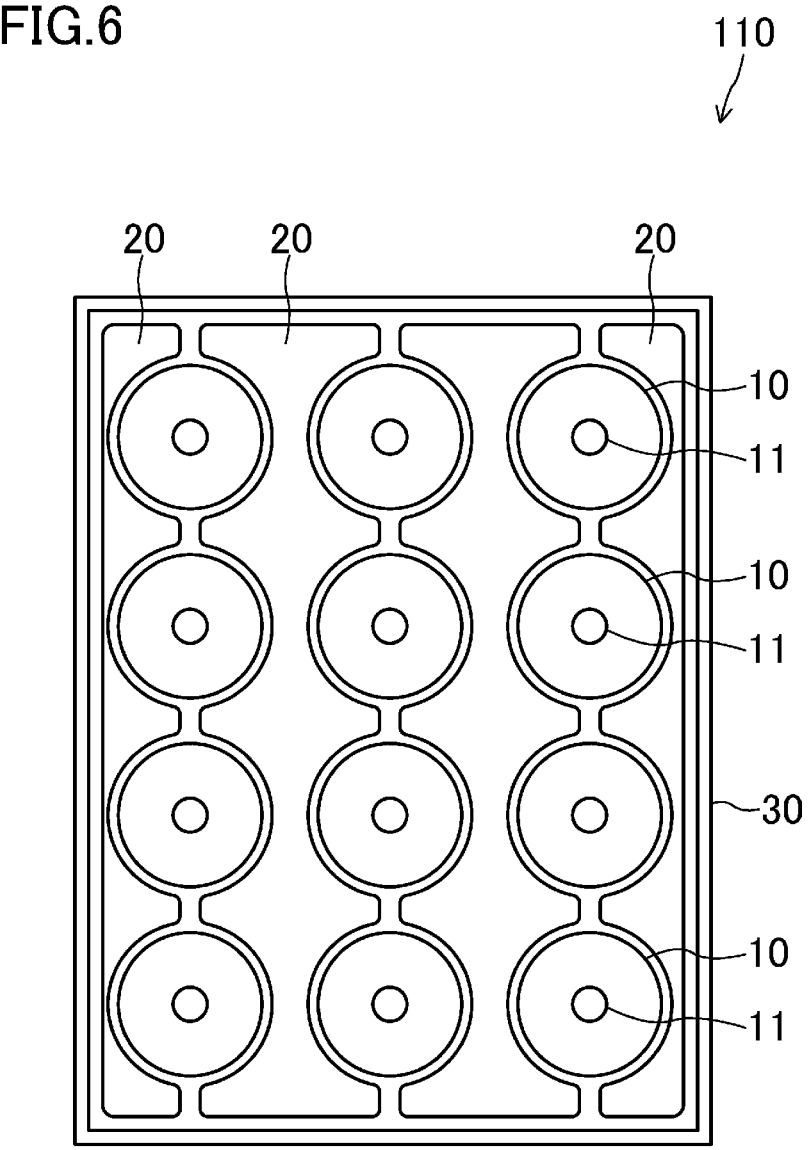
FIG. 6 is a plan view schematically illustrating a configuration of a battery module of another embodiment of the present invention.

FIG. 6 is a plan view schematically illustrating a configuration of a battery module 110 of another embodiment of the present invention, where the battery module 110 is different from the battery module 100 of FIG. 3 in arrangement of cooling units 20.

That is, as illustrated in FIG. 6, the cooling units 20 of the present embodiment are disposed along outer circumferences of the cells 10, and each cooling unit 20 is formed as one piece provided for the plurality of cells 10. For example, in the case of cylindrical cells 10, each cooling unit 20 is disposed approximately half way around circumferences on side surfaces of the cells 10.

Here, the cooling unit 20 includes an unsealable portion (not shown) which is partially unsealed to release the coolant when the temperature of the cell 10 rises and reach or exceeds a predetermined temperature. Moreover, the coolant contained in the cooling unit 20 is liquid adjusted by adding a thickener to have a viscosity within the range of 2 Pa·s to 350 Pa·s.

In the present embodiment, since the cooling units 20 are disposed along the outer circumferences of the cells 10, the area of the cooling unit 20 facing the abnormally heated cell 10 increases, and the coolant released through the unsealable portion of the cooling unit 20 is evenly supplied to the outer circumferences of the cells 10. As a result, the abnormally heated cell 10 can be more efficiently cooled.

FIG. 7 is a plan view schematically illustrating a configuration of a battery module 120 of still another embodiment of the present invention, where the battery module 120 is different from the battery module 100 of FIG. 3 in position of a cooling unit 20.

That is, as illustrated in FIG. 7, the cooling unit 20 of the present embodiment is disposed on one side relative to aligned cells 10 (on an upper side of the cells 10 in FIG. 7). In this case, one cooling unit 20 may be arranged for all the cells 10, so that it is possible to reduce the area occupied by the cooling unit 20 in the battery module 120.

In the description above, the present invention has been described with reference to the preferable embodiments, but the description above is not intended to limit the scope of the invention. Of course, various modifications can be made. For example, although the cells 10 included in the battery module are lithium ion secondary batteries in the above embodiments, the cells 10 may be other secondary batteries (e.g., nickel-hydrogen batteries). Moreover, the cells 10 may be cylindrical batteries, square batteries, or laminate batteries.

Moreover, although in the embodiments above, the cooling unit 20 is made of a laminate film in which a coolant is sealed, the cooling unit 20 may include, for example, a mechanism which includes a temperature sensor for detecting the temperature of the cooling unit 20, and detects that the temperature of the cooling unit 20 reaches or exceeds a predetermined temperature to forcibly unseal the unsealable portion provided on the cooling unit 20. Moreover, an anti-freezing agent may be added to the coolant.

INDUSTRIAL APPLICABILITY

The battery module of the present invention is preferably used as a power source of portable electric devices such as personal computers, and mobile phones, or a power source for driving electric tools, electric vehicles, etc.

DESCRIPTION OF REFERENCE CHARACTERS

10 Cell
11 Raised Section
20 Cooling Unit
21 Laminate Film
22 Sealed Portion
23 Sealed Portion (Unsealable portion)
30 Case
100 Battery Module

The invention claimed is:

1. A battery module comprising:
a plurality of cells, wherein
a cooling unit in which a coolant is sealed is disposed in a vicinity of the cells,
the coolant is liquid adjusted to have a viscosity within a range of 2 Pa·s to 350 Pa·s, and
the cooling unit includes an unsealable portion which is partially unsealed to release the coolant when at least one of the cells abnormally generates heat.

2. The battery module of claim 1, wherein
the liquid is made of water to which a thickener is added.

3. The battery module of claim 1, wherein
the cooling unit is disposed between the cells adjacent to each other.

4. The battery module of claim 1, wherein
the cooling unit is made of a laminate film in which the coolant is sealed.

5. The battery module of claim 4, wherein
the laminate film has a sealed portion fused at a rim of the laminate film, and
the unsealable portion is part of the sealed portion, and the part has a lower welding strength than the other parts of the sealed portion.

6. The battery module of claim 5, wherein
the laminate film includes two kinds of fusion layers having different melting points, and
a melting point of the fusion layer of the unsealable portion is lower than a melting point of the fusion layer of the other parts of the sealed portion.

7. The battery module of claim 1, wherein
the cooling unit is disposed along outer circumferences of the cells.

8. The battery module of claim 1, wherein
the cooling unit is formed as one piece provided for the plurality of cells.

9. The battery module of claim 2, wherein
the thickener is at least one selected from the group consisting of carboxymethylcellulose, xanthan gum, gelatin, and alginic acid.

10. The battery module of claim 1, wherein
the coolant contains an anti-freezing agent.

11. The battery module of claim 1, wherein
the cooling unit is disposed such that the unsealable portion is in contact with outer surfaces of the cells.

12. The battery module of claim 2, wherein
the coolant contains an anti-freezing agent.

13. The battery module of claim 1, wherein the plurality of cells are cooled to a temperature of 120° C. or lower by the released coolant.

* * * * *